США011929091B2

United States Patent
Zhang et al.

(10) Patent No.: US 11,929,091 B2
(45) Date of Patent: *Mar. 12, 2024

(54) BLIND DETECTION OF BINAURALIZED STEREO CONTENT

(71) Applicant: Dolby Laboratories Licensing Corporation, San Francisco, CA (US)

(72) Inventors: Chunmao Zhang, Fremont, CA (US); Lianwu Chen, Beijing (CN); Ziyu Yang, Beijing (CN); Joshua Brandon Lando, San Francisco, CA (US); David Matthew Fischer, San Francisco, CA (US); Lie Lu, Dublin, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,662

(22) Filed: Mar. 1, 2022

(65) Prior Publication Data

US 2022/0366933 A1 Nov. 17, 2022

Related U.S. Application Data

(63) Continuation of application No. 17/050,786, filed as application No. PCT/US2019/028887 on Apr. 24, 2019, now Pat. No. 11,264,050.

(Continued)

(30) Foreign Application Priority Data

Apr. 27, 2018 (WO) ................ PCT/CN2018/084757
Jun. 14, 2018 (EP) ..................................... 18177821

(51) Int. Cl.
| | |
|---|---|
| G10L 25/78 | (2013.01) |
| G06N 3/08 | (2023.01) |
| G10L 25/30 | (2013.01) |
| H04R 5/033 | (2006.01) |
| H04R 5/04 | (2006.01) |
| H04S 1/00 | (2006.01) |

(52) U.S. Cl.
CPC ................ G10L 25/78 (2013.01); G06N 3/08 (2013.01); G10L 25/30 (2013.01); H04R 5/033 (2013.01);
(Continued)

(58) Field of Classification Search
CPC ......... G10L 25/78; G10L 25/30; G10L 25/51; G06N 3/08; H04R 5/033; H04R 5/04;
(Continued)

(56) References Cited

U.S. PATENT DOCUMENTS

| 7,756,281 B2 | 7/2010 | Goldstein |
| 9,311,923 B2 | 4/2016 | Radhakrishnan |

(Continued)

FOREIGN PATENT DOCUMENTS

| CN | 101588531 A | 11/2009 |
| CN | 102187691 B | 4/2014 |

(Continued)

OTHER PUBLICATIONS

May, T. et al "Binaural Detection of Speech Sources in Complex Acoustic Scenes" Oct. 19, 2011, IEEE Applications of Signal Processing to Audio and Acoustics.

Primary Examiner — Yogeshkumar Patel (57) ABSTRACT

An apparatus and method of blind detection of binauralized audio. If the input content is detected as binaural, a second binauralization may be avoided. In this manner, the user experience avoids audio artifacts introduced by multiple binauralizations.

20 Claims, 4 Drawing Sheets

Related U.S. Application Data (60) Provisional application No. 62/677,829, filed on May 30, 2018.

(52) U.S. Cl.
CPC ............... H04R 5/04 (2013.01); H04S 1/002 (2013.01); H04R 2420/07 (2013.01)

(58) Field of Classification Search
CPC .......... H04S 1/002; H04S 7/306; H04S 3/004; H04S 2420/07; H04S 2400/01; H04S 2420/01
See application file for complete search history.

(56) References Cited

U.S. PATENT DOCUMENTS

| | | | |
|---|---|---|---|
| 9,319,821 B2 | 4/2016 | Arrasvuori | |
| 9,420,393 B2 | 8/2016 | Morrell | |
| 9,584,946 B1 | 2/2017 | Lyren | |
| 9,781,528 B2 | 10/2017 | Hess | |
| 9,933,989 B2 | 4/2018 | Tsingos | |
| 11,264,050 B2 * | 3/2022 | Zhang | G10L 25/78 |
| 2013/0279724 A1 | 10/2013 | Stafford | |
| 2013/0279726 A1 | 10/2013 | Baughman | |
| 2014/0336800 A1 * | 11/2014 | Radhakrishnan | G10L 19/018 700/94 |
| 2016/0056787 A1 | 2/2016 | Lu | |
| 2016/0266865 A1 * | 9/2016 | Tsingos | G06F 3/162 |
| 2017/0295278 A1 * | 10/2017 | Lyren | H04S 7/304 |
| 2018/0068670 A1 * | 3/2018 | Lu | G10H 1/12 |

FOREIGN PATENT DOCUMENTS

| | | |
|---|---|---|
| CN | 104618848 B | 7/2017 |
| JP | 2005338086 A | 12/2005 |
| JP | 2016067817 A | 5/2016 |
| JP | 2016519493 A | 6/2016 |
| WO | 2017182716 A1 | 10/2017 |

* cited by examiner

BLIND DETECTION OF BINAURALIZED STEREO CONTENT

CROSS REFERENCE TO RELATED APPLICATIONS

This application is a continuation of U.S. patent application Ser. No. 17/050,786 filed Oct. 26, 2020, which is the U.S. national stage of International Patent Application No. PCT/US2019/028887 filed on Apr. 24, 2019, which in turn claims priority to U.S. Provisional Application No. 62/677,829 filed on May 30, 2018. PCT/US2019/028887 filed on Apr. 24, 2019 claims priority to EP Application No. 18177821.8 filed on Jun. 14, 2018, and claims priority to International Patent Application No. PCT/CN2018/084787 filed on Apr. 27, 2018. Each of these applications is hereby incorporated by reference in its entirety.

BACKGROUND

The present invention relates to binaural audio, and in particular, to blind detection of binauralized audio data.

Unless otherwise indicated herein, the approaches described in this section are not prior art to the claims in this application and are not admitted to be prior art by inclusion in this section.

Binauralization of multi-channel or object-based audio content is a common technique for simulating the effects of surround sound on headphones. Often, simulated or synthesized Head Related Transfer Functions (HRTFs) are used to perform this simulation, resulting in magnitude and phase response changes. Binauralization may also be referred to as virtualization, and the generated sound may be referred to as binaural audio or virtualized audio.

Multiple examples of consumer applications of binauralization exist, such as with Dolby's headphone binaural rendering solutions. One typical configuration to achieve binauralization is to connect a source device, capable of performing the processing, to a headphone. Alternately, content may be transmitted to an advanced headphone capable of performing the binaural processing.

A scenario exists where the source device and headphone could both apply binaural processing. This can have adverse effect on the audio, as the magnitude and phase responses from both binaural processes would compound, resulting in a negative user experience.

One means to avoid dual processing in the above configuration is to support a uni-directional communication from the source to the headphone indicating when binaural processing is active, so that the headphone may disable its processing stage. However, in wireless applications such as the IEEE 802.15.1 standard (e.g., Bluetooth™ audio), there exists no shared profile for communicating such information. Furthermore, if such a profile were to exist, there is no guarantee that the source device would properly signal such processing.

U.S. Pat. No. 9,311,923 discusses performing feature extraction on an audio signal to generate a conditional probability score that is used for subsequent processing of the audio signal. However, such discussion does not provide much detail regarding the specific problems involved in binaural processing.

U.S. Pat. No. 9,933,989 discusses rendering input audio into binaural audio using binaural rendering metadata. However, such discussion does not contemplate the situation where the input audio has already been binauralized.

SUMMARY

Given the above, there is a need for a blind detection process that is capable of determining when up-stream content has been binauralized. An embodiment is directed to using machine learning techniques to perform blind detection of binauralized audio.

According to an embodiment, an apparatus detects binauralization of an audio signal. The apparatus comprises a feature extractor, a classifier, a virtualizer, and a mixer. The feature extractor receives an input audio signal, and extracts a plurality of features from the input audio signal. The classifier receives the plurality of features extracted by the feature extractor, performs a classification of the plurality of features, and generates a result based on the classification. The result indicates a probability that the input audio signal is a binaural signal versus a stereo signal. The virtualizer receives the input audio signal, and performs virtualization on the input audio signal to generate a binaural audio signal. The mixer receives the input audio signal, the binaural audio signal and the result, and the mixer mixes the input audio signal and the binaural audio signal, according to the result, to generate an output audio signal. When the result indicates that the input audio signal is the stereo signal, the output audio signal corresponds to the binaural audio signal, and when the result indicates that the input audio signal is the binaural signal, the output audio signal corresponds to the input audio signal.

The apparatus may further comprise a smoother that smooths the result from the classifier, and that provides the result, having been smoothed, to the mixer, where the mixer mixes the input audio signal and the binaural audio signal according to the result having been smoothed by the smoother. The result, having been smoothed by the smoother, may be provided to the virtualizer, and the virtualizer may perform virtualization based on the result having been smoothed.

The feature extractor may transform the input audio signal into transform domain information.

The feature extractor may extracts features including at least one of an inter-channel time difference (ICTD) feature, an inter-channel phase difference (ICPD) feature, an inter-channel level difference (ICLD) feature, and an inter-channel coherence (ICC) feature.

The feature extractor may transform the input audio signal into hybrid complex quadrature mirror filter (HCQMF) domain information. The feature extractor may extract features including an inter-channel phase difference (ICPD) of a subset of bands of the HCQMF domain information. The HCQMF domain information may include 77 bands, and wherein the subset of bands includes bands 21-60.

The feature extractor may transform the input audio signal into hybrid complex quadrature mirror filter (HCQMF) domain information, where the feature extractor groups the HCQMF domain information into a plurality of sub-bands, where the feature extractor extracts features including an inter-channel phase difference (ICPD) feature of a first subset of the plurality of sub-bands, an inter-channel coherence (ICC) feature of the first subset of the plurality of sub-bands, and an inter-channel level difference (ICLD) feature of a second subset of the plurality of sub-bands.

The feature extractor may comprise a signal transformer, a features calculator, a parameter mask, a histogram analyzer, and a statistics calculator. The signal transformer generates transform domain information from the input audio signal. The features calculator calculates a plurality of raw features from the transform domain information. The parameter mask applies masking to the plurality of raw features, to generate a plurality of modified features. The histogram analyzer calculates a plurality of histograms on a plurality of parameter bands for each of the plurality of modified features. The statistics calculator calculates a plurality of window-level statistics from the plurality of modified features and the plurality of histograms, where the plurality of window-level statistics correspond to the plurality of features extracted by the feature extractor.

The classifier may implement a machine learning model to perform the classification of the plurality of features. The machine learning model may be one of an adaptive boosting model, a deep neural network model, and a sparse deep neural network model.

The apparatus may comprise a processor and a memory, where the processor implements the feature extractor, the classifier, the virtualizer, and the mixer. The memory may store a computer program, where the processor executes the computer program to implement the feature extractor, the classifier, the virtualizer, and the mixer.

The apparatus may further comprise a left speaker and a right speaker, where the output audio signal includes a left output component and a right output component, where the left speaker outputs the left output component, and where the right speaker outputs the right output component.

The apparatus may further comprise a first earbud and a second earbud, where the first earbud includes a first speaker, a first processor and a first memory, where the first processor implements the feature extractor, the classifier, the virtualizer, and the mixer; and where the second earbud includes a second speaker, a second processor and a second memory, where the second processor implements a second feature extractor, a second classifier, a second virtualizer, and a second mixer.

According to another embodiment, a method detects binauralization of an audio signal. The method comprises receiving an input audio signal. The method further comprises extracting, by a feature extractor, a plurality of features from the input audio signal. The method further comprises performing, by a classifier, a classification of the plurality of features extracted by the feature extractor. The method further comprises generating, by the classifier, a result based on the classification, where the result indicates a probability that the input audio signal is a binaural signal versus a stereo signal. The method further comprises performing virtualization, by a virtualizer, on the input audio signal to generate a binaural audio signal. The method further comprises mixing, by a mixer, the input audio signal and the binaural audio signal, according to the result, to generate an output audio signal. When the result indicates that the input audio signal is the stereo signal, the output audio signal corresponds to the binaural audio signal, and when the result indicates that the input audio signal is the binaural signal, the output audio signal corresponds to the input audio signal.

The method may include similar details to those discussed above regarding the apparatus.

According to another embodiment, a non-transitory computer readable medium stores a computer program that, when executed by a processor, controls an apparatus to execute processing including one or more of the methods discussed above.

The following detailed description and accompanying drawings provide a further understanding of the nature and advantages of various implementations.

DETAILED DESCRIPTION

Described herein are techniques for blind detection of binauralized audio. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

Figure 1:
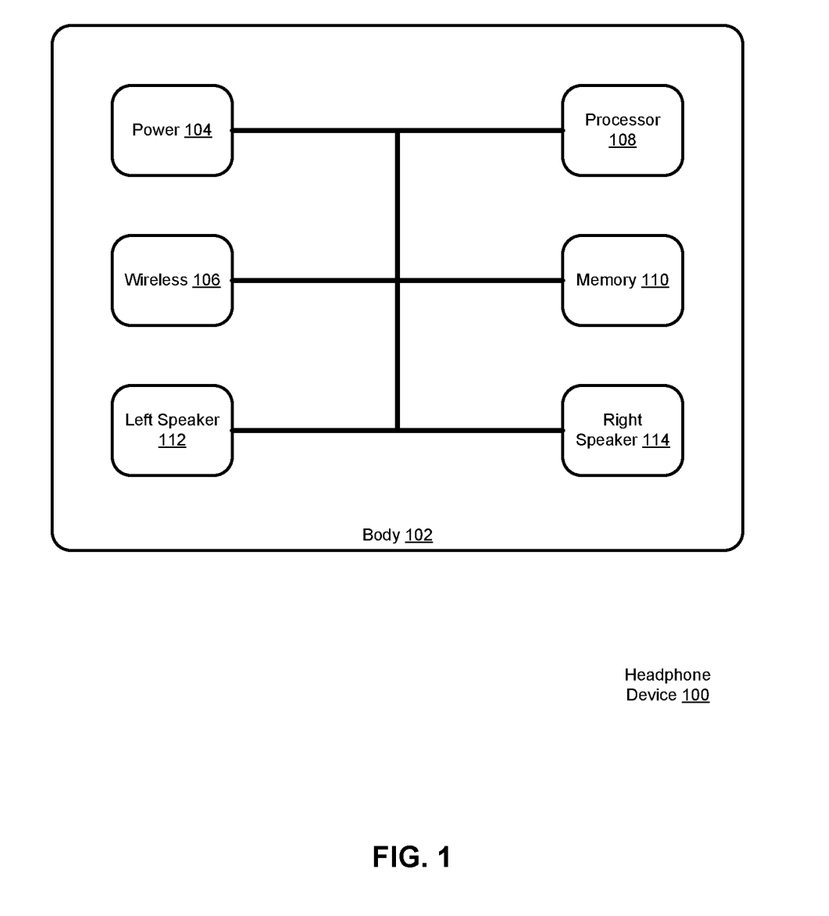
FIG. 1 is a block diagram of a headphone device 100.

FIG. 1 is a block diagram of a headphone device 100. (Note that this block diagram is not shown in the form factor of headphones.) The headphone device 100 includes a body 102, a power component 104, a wireless component 106, a processor 108, a memory 110, a left speaker 112, and a right speaker 114. The headphone device 100 may include other components that (for brevity) are not shown. In general, a user wears the headphone device 100 in order to listen to audio signals received wirelessly.

The body 102 generally provides structural support for the headphone device 100 and secures the other components. The details of the body 102 may differ, depending on the form factor. For a traditional headphone form factor, the body 102 includes a headband that joins earpads containing the speakers 112 and 114. For an earbud headphone form factor, the earbuds are a headphone pair (e.g., a left earbud and a right earbud), where the body 102 of each earbud includes one of the speakers 112 or 114 and the other components (processor, wireless component, etc.). As an example implementation of the earbud form factor, one of the earbuds operates as a master and performs most of the processing; the other earbud operates as a slave, and receives the processed audio from the master through a limited near-field magnetic induction (NFMI) channel.

The power component 104 generally provides electrical power to the other components. The power component 104 may include a battery such as a rechargeable battery.

The wireless component 106 generally transmits and receives wireless signals. The wireless component 106 may implement the IEEE 802.15.1 standard (e.g., Bluetooth™). The wireless component 106 generally receives an input audio signal and provides the input audio signal to the other components.

The processor 108 works with the memory 110 to process the audio signal received from the wireless component 106. The processor 108 generally implements a machine learning process, as further detailed below, to perform blind detection of binauralized audio. The memory 110 generally stores the machine learning parameters. The processor 108 also implements a binauralization process, as further detailed below.

The left speaker 112 outputs a left channel output audio signal, and the right speaker 114 outputs a right channel output audio signal (collectively, the output audio signal). When the processor 108 detects, according to the blind detection process, that the input audio signal is a binaural signal, the output audio signal corresponds to the input audio signal. When the processor 108 detects that the input audio signal is not a binaural signal (e.g., it is a stereo signal), the output audio signal corresponds to a binauralized audio signal generated by the processor 108. In this manner, the output signal corresponds to a signal that has been binauralized only once, and not to an already-binauralized input signal that is then binauralized a second time. Thereby, a negative user experience is avoided.

Figure 2:
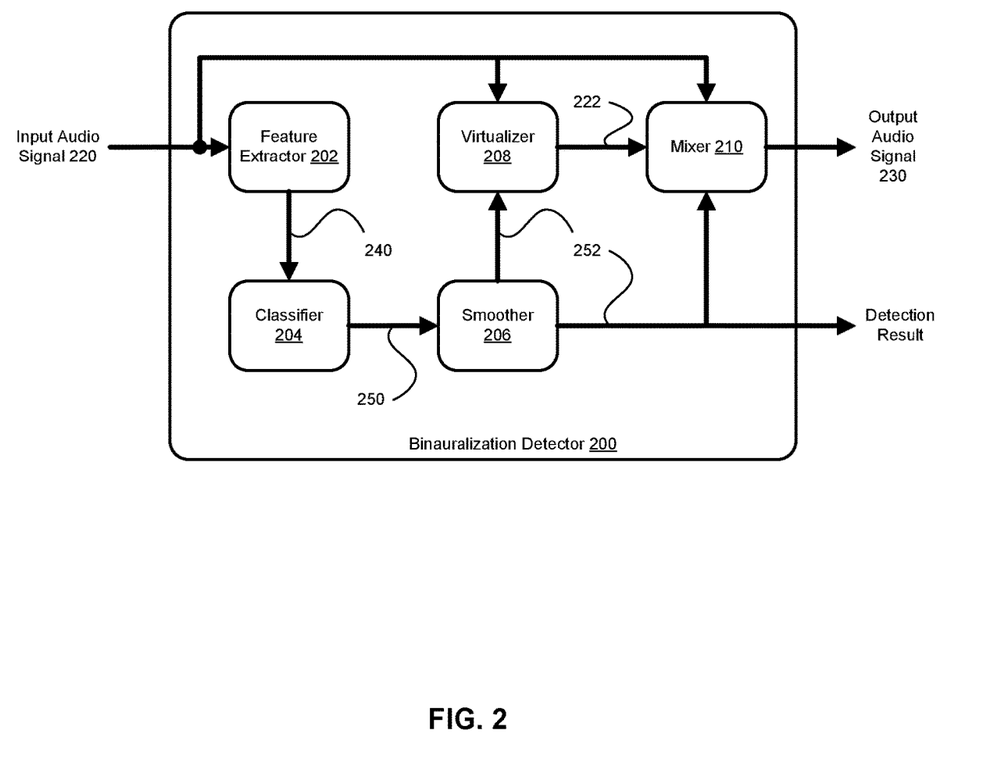
FIG. 2 is a block diagram of a binauralization detector 200.

FIG. 2 is a block diagram of a binauralization detector 200. In general, the binauralization detector 200 performs blind detection of binauralization, and generates an appropriate output signal (e.g., not a twice-binauralized signal), as discussed above regarding FIG. 1. The binauralization detector 200 may be implemented by the processor 108 and memory 110 (see FIG. 1), for example by storing and executing one or more computer programs.

The binauralization detector 200 receives an input audio signal 220, and generates an output audio signal 230. The input audio signal 220 may be a two-channel audio signal, such as a two-channel stereo signal or a two-channel binaural signal. For example, the input audio signal 220 may include a left channel signal and a right channel signal, each being a pulse code modulation (PCM) signal sampled at 44.1 or 48 kHz and having 16 or 24 bits per sample. (Note that the input audio signal 220 results from the wireless component 106 of FIG. 1 having performed decoding on the received wireless signals, which may be in formats other than PCM.) The binauralization detector 200 may operate on a per-frame basis of the input audio signal 220 (e.g., 20 ms frame size), and may also operate on a multi-frame or per-window basis (e.g., 48 frames or 1 second).

The binauralization detector 200 includes a feature extractor 202, a classifier 204, a smoother 206, a virtualizer 208, and a mixer 210.

The feature extractor 202 generally extracts features 240 from the input audio signal 220. As mentioned above, the features 240 may include frame-level features, window-level features, and statistics (mean, standard deviation, etc.) of the frame-level features and window-level features. Further details of the feature extractor 202 are provided below with reference to FIG. 4.

The classifier 204 generally performs a classification on the features 240 extracted by the feature extractor 202, and generates a result 250 based on the classification. The result 250 may be in the form of a confidence score. As mentioned above, the classifier 204 may implement a machine learning process, as further detailed below. The result 250 indicates a probability that the input audio signal 220 is a binaural signal versus a stereo signal. For example, the result 250 may be 95% that the input audio signal 220 is a binaural signal (or conversely, 5% that the input audio signal 220 is a stereo signal).

The smoother 206 generally smooths the result 250 from the classifier 204, to generate a smoothed result 252. When the classifier 204 performs the classification based on frame level features, it is possible that the classifier 204 mis-classifies a frame as binaural (versus stereo). In the absence of smoothing, this mis-classification may introduce audio artifacts due to the binauralization detector 200 switching between passing through an already-binauralized signal and generating a binaural signal. For example, if the binauralization detector 200 is passing through an already-binauralized signal for 100 frames, then mis-classifies one frame as stereo and performs binauralization, then switches back to passing through the already-binauralized signal, this could result in audio artifacts. Thus, the smoother 206 operates to smooth the result 250, thereby reducing the impact of mis-classification.

The smoother 206 may apply an adaptive smoothing to prevent the instability issues and reduce the delay for the transition between stereo and binaural. The smoothing may be achieved via a combination of a median filter and a one-pole filter. For the confidence score s(t) generated by the classifier 204, the smoothed score s'(t) is calculated by $$s'(t)=a \cdot m(t)+(1-a) \cdot s(t) \quad (1)$$

$$m(t)=\text{median}(s(t),s(t-1),\ldots,s(t-D+1)) \quad (2)$$

where median (*) denotes the median value of a vector.

The delay time D varies adaptively according to the stability of original scores. Specifically, a large smoothing delay will be applied when the original score is instable, while adopting a small smoothing delay when the original score is stable. The delay time D may be preset to several modes (e.g., fast, medium and slow), which may be further adaptively chosen in practical applications. For example, the delay time D may be set to 4 seconds for fast mode, 6 seconds for medium mode, and 10 seconds for slow mode. The value of a may be adjusted as desired according to the application; a typical value for a is 0.89.

(Note that the smoother 206 may be omitted in embodiments, in which case the result 250 from the classifier 204 is provided to the virtualizer 208, or to the mixer 210, without smoothing.)

The virtualizer 208 generally performs virtualization on the input audio signal 220 to generate a binaural audio signal 222. The virtualizer 208 may receive the result 250 from the classifier 204 (or the smoothed result 252 as smoothed by the smoother 206), and may use the result 250 (or the smoothed result 252) when performing its virtualization. For example, if the result 250 (or the smoothed result 252) consistently indicates a high probability that the input audio signal 220 is a binaural signal for 10 seconds, the virtualizer 208 may deactivate its virtualization, or otherwise reduce its processing of the input audio signal 220.

According to an alternative embodiment, the virtualizer 208 operates continuously, and does not receive the result 250 from the classifier 204 (or the smoothed result 252 as smoothed by the smoother 206).

The virtualizer 208 may implement one or more of a variety of binauralization processes, according to design criteria or user selection. Example binauralization processes include the Dolby® Headphone binauralization process, the DTS Headphone X™ binauralization process, the MaxxSpace™ binauralization process, the Fraunhofer Cingo® binauralization process, etc.

In other embodiments, the virtualizer 208 may operate without receiving the result 250 from the classifier 204 (or the smoothed result 252 from the smoother 206).

The mixer 210 generally mixes the input audio signal 220 and the binaural audio signal 222, according to the result 250 from the classifier 204 (as or the smoothed result 252 from the smoother 206), to generate the output audio signal 230. (The mixer 210 may also perform other functions, such as time-aligning its inputs by delaying the input audio signal 220 to match any delay involved in generating the binaural audio signal 222.) When the result 250 (or the smoothed result 252) indicates that the input audio signal 220 is a stereo signal, the output audio signal 230 corresponds to the binaural audio signal 222, and when the result 250 (or the smoothed result 252) indicates that the input audio signal 220 is a binaural signal, the output audio signal 230 corresponds to the input audio signal 220. For example, if the result 250 indicates 95% that the input audio signal 220 is a binaural signal, the mixer 210 mixes the output audio signal 230 to correspond 95% to the input audio signal 220 and 5% to the binaural audio signal 222. Conversely, if the result 250 indicates 5% that the input audio signal 220 is a binaural signal, the mixer 210 mixes the output audio signal 230 to correspond 5% to the input audio signal 220 and 95% to the binaural audio signal 222.

As another example, the mixer 210 uses the classification result 250 (or the smoothed result 252) to steer the on/off of headphone virtualizers for 2-channel audio binauralization. We use $x_{vir}(t)$ and $x_{ori}(t)$ to denote the audio signal applying the headphone virtualizer (e.g., the binaural audio signal 222) and the original signal (e.g., the input audio signal 220), respectively. Then, the binauralization mix y(t) can be achieved by the following mixing approach:

$$y(t)=g(t)x_{vir}(t)+(1-g(t))x_{ori}(t) \qquad (3)$$

where g(t) is a time-varying gain. The gain can be binary (1 or 0) to indicate whether the original content is binauralized or not. In this case, the headphone virtualizer is steered by the binauralization detector (e.g., according to the result 250 or the smoothed result 252). On the other hand, we can set the gain as a continuous number for binauralization of the input audio. In that case, we can use the result 250 (or the smoothed confidence score 252 s'(t)) itself, instead of a binary value, as the gain.

Figure 3:
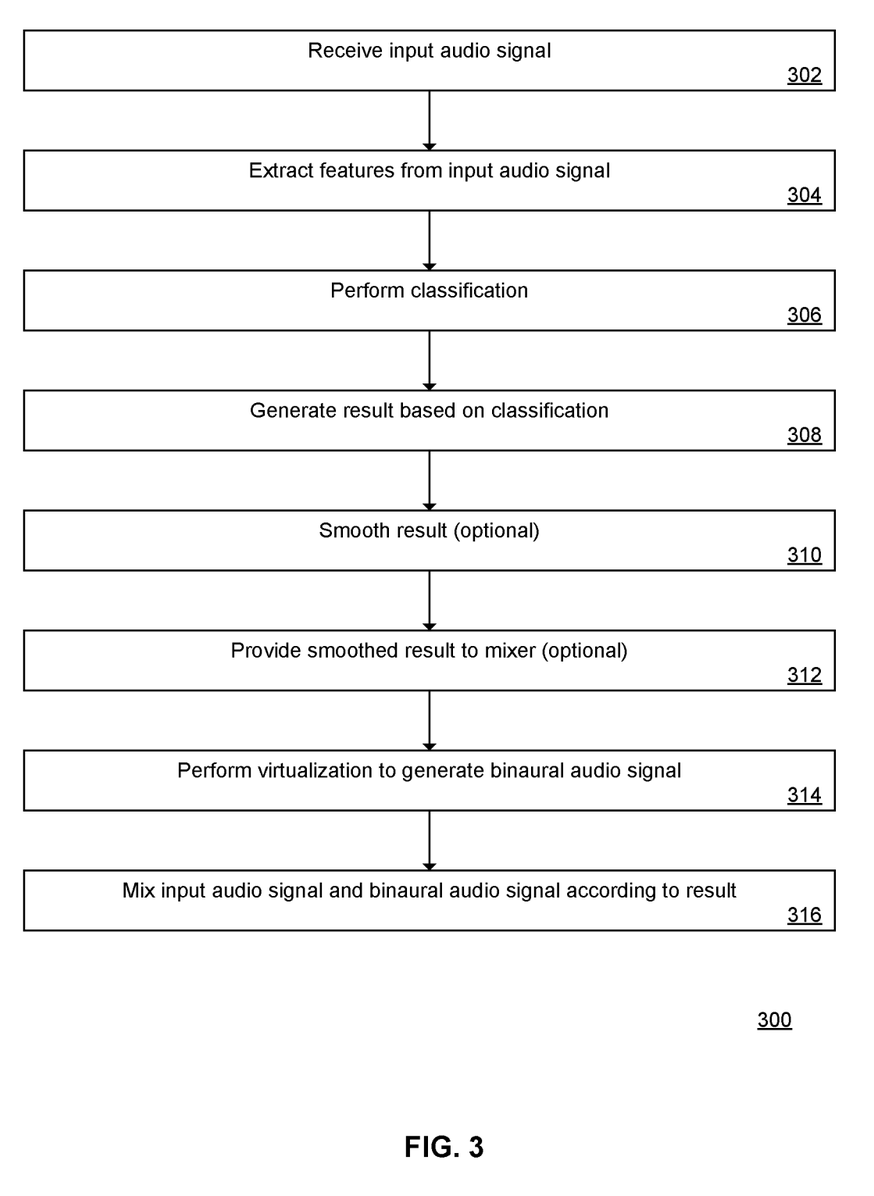
FIG. 3 is a flowchart of a method 300 of detecting binauralization of an audio signal.

FIG. 3 is a flowchart of a method 300 of detecting binauralization of an audio signal. The method 300 may be implemented by the headphone device 100 (see FIG. 1), as controlled by the processor 108, for example according to the execution of one or more computer programs.

At 302, an input audio signal is received. For example, the wireless component 106 (see FIG. 1) may receive the input audio signal 220 (see FIG. 2).

At 304, a plurality of features are extracted from the input audio signal. For example, the feature extractor 202 (see FIG. 2) may extract the features 240 from the input audio signal 220.

At 306, a classification of the plurality of features extracted by the feature extractor is performed. For example, the classifier 204 (see FIG. 2) may perform a classification of the features 240 extracted by the feature extractor 202.

At 308, a result is generated based on the classification. For example, the classifier 204 (see FIG. 2) may generate the result 250 based on the classification (see 306). The result indicates a probability that the input audio signal is a binaural signal versus a stereo signal.

At 310 the result from the classifier is smoothed. For example, the smoother 206 (see FIG. 2) may smooth the result 250 from the classifier 204, to generate the smoothed result 252. (Note that 310 is optional, and may be omitted in embodiments that do not implement smoothing.)

At 312, the result having been smoothed is provided to a mixer. For example, the smoother 206 (see FIG. 2) may provide the smoothed result 252 to the mixer 210. (Note that 312 is optional, and may be omitted in embodiments that do not implement smoothing.)

At 314, virtualization is performed on the input audio signal to generate a binaural audio signal. For example, the virtualizer 208 (see FIG. 2) may perform virtualization on the input audio signal 220 to generate the binaural audio signal 222.

At 316, the input audio signal and the binaural audio signal are mixed, according to the result, to generate an output audio signal. For example, the mixer 210 (see FIG. 2) may mix the input audio signal 220 and the binaural audio signal 222, according to the result 250 from the classifier 204, to generate the output audio signal 230. In this manner, when the result indicates that the input audio signal is the stereo signal, the output audio signal corresponds to the binaural audio signal, and when the result indicates that the input audio signal is the binaural signal, the output audio signal corresponds to the input audio signal.

In embodiments that include smoothing (e.g., 310 and 312), the input audio signal and the binaural audio signal are mixed according to the result having been smoothed by the smoother. For example, the mixer 210 (see FIG. 2) may perform mixing according to the smoothed result 252 from the smoother 206. In embodiments that do not include smoothing (e.g., when 310 and 312 are omitted), the input audio signal and the binaural audio signal are mixed according to the result from the classifier. For example, the mixer 210 (see FIG. 2) may perform mixing according to the result 250 from the classifier 204 (e.g., without smoothing by the smoother 206).

Figure 4:
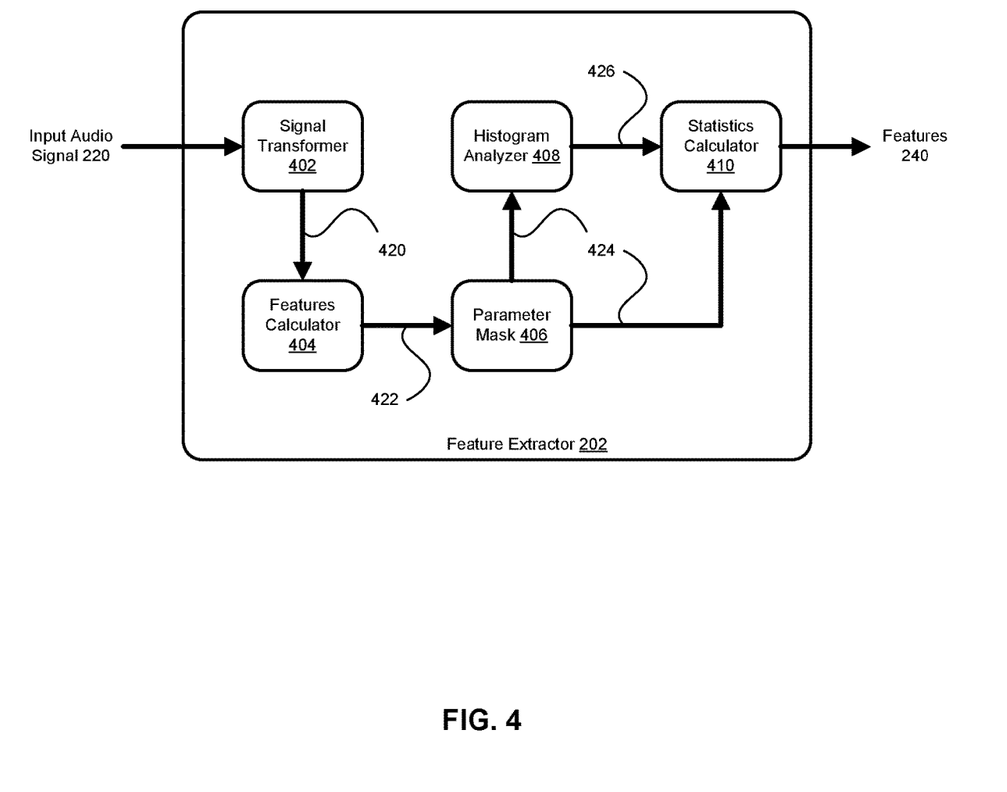
FIG. 4 is a block diagram showing additional details of the feature extractor 202 (see FIG. 2).

FIG. 4 is a block diagram showing additional details of the feature extractor 202 (see FIG. 2). The feature extractor 202 includes a signal transformer 402, a features calculator 404, a parameter mask 406, a histogram analyzer 408, and a statistics calculator 410. These components may be implemented by the processor 108 and memory 110 (see FIG. 1), for example by storing and executing one or more computer programs.

The signal transformer 402 generally receives the input audio signal 220 and performs a transformation to generate transform domain information 420. In general, transformation refers to converting a signal from one signal domain to another signal domain. For example, the input audio signal 220 may be a time-domain signal (e.g., a PCM signal), and the transform domain information 420 may be frequency domain information, quadrature mirror filter (QMF) domain information, complex QMF (CQMF) domain information, hybrid CQMF (HCQMF) domain information, etc. In general, QMF domain information is generated by a filter whose magnitude response is the mirror image around π/2 of that of another filter; together these filters are known as the QMF pair. In general, CQMF domain information results when the QMF filter coefficients include complex values. In general, HCQMF domain information corresponds to CQMF domain information in which the CQMF filter bank has been extended to a hybrid structure to obtain an efficient non-uniform frequency resolution that matches the frequency resolution of the human auditory system. According to a specific HCQMF implementation, the HCQMF information is generated into 77 frequency bands, where the lower CQMF sub-bands are further split in order to obtain a higher frequency resolution for the lower frequencies. As further detailed below, the signal transformer 402 generates HCQMF domain information as the transform domain information 420. According to a specific implementation, the input audio signal 220 is a 48 kHz sampled time domain signal in two channels, and the signal transformer 402 transforms each channel into 60 sub-divided bands in the HCQMF domain, to form the transform domain information 420. According to another specific implementation, the signal transformer 402 transforms each channel into 64 CQMF sub-bands, and further divides the lowest 3 sub-bands into sub-sub-bands as follows: the first sub-band is divided into 8 sub-sub-bands, the second and third sub-bands are each divided into 4 sub-sub-bands.

For the input audio signal 220 represented by the input signal pair $x_1(n)$, $x_2(n)$, the signal transformer 402 performs a transform domain transformation to decompose the signals into a number of sub-bands (frequency bands) signal to form the transform domain information 420, denoted $x_1(k)$ and $x_2(k)$. The feature extraction is operating on the transform domain information (e.g., the frequency-band representation).

The features calculator 404 generally calculates one or more features 422 from the transform domain information 420. These features 422, also referred to as the raw features, may include one or more of an inter-channel level difference (ICLD), an inter-channel phase difference (ICPD), an inter-channel coherence (ICC), and an inter-channel time difference (ICTD). (Note that the ICTD feature may be omitted in transform domain processing, such as in an HCQMF implementation.)

The ICLD $\Delta L$ (k) for the complex-value signals $x_1(k)$ and $x_2(k)$ may be calculated by $$\Delta L(k) = 10\log_{10}\frac{x_1(k)x_1^*(k)}{x_2(k)x_2^*(k)} \quad (4)$$

where (*) denotes complex conjugation.

The ICPD $\phi(k)$ for $x_1(k)$ and $x_2(k)$ can be calculated by $$\phi(k) = \angle(x_1(k)x^*_2(k)) \quad (5)$$

where $\angle$ (*) denotes directional angle of a complex number.

The ICC c(k) for $x_1(k)$ and $x_2(k)$ can be calculated by $$c(k) = \max_d |\Phi_{12}(d, k)| \quad (6)$$

where $\Phi_{12}$ (d, k) is the normalized cross-correlation function $$\Phi_{12}(d, k) = \frac{p_{x_1 x_2}(d, k)}{\sqrt{p_{x_1}(k-d_1)p_{x_2}(k-d_2)}} \quad (7)$$

where $$d_1 = \max\{-d, 0\} \quad (8.1)$$

$$d_2 = \max\{d, 0\} \quad (8.2)$$

and p(*) is a short-time estimation of the mean.

Note that all the raw features are functions of frequency band k. For notational simplicity, we use r(k) to denote one or more of the raw features above.

The parameter mask 406 generally applies masking to the features 422 to generate modified features 424, where the masking is applied to bands of interest. The frequency bands $\{1, \ldots, K\}$ can be divided into several parameter bands $\{k_b\}_{b=1, \ldots, B}$ to mimic the concept of critical bands. Note that the division manner is dependent of sampling rate of audio signals.

For each raw feature r(k) (which can be one of ICLD, ICPD, ICC, etc.), a feature-specific parameter band masking $M_r$ (k) is applied to the corresponding raw feature to obtain the modified feature r'(k):

$$r'(k) = M_r(k) \cdot r(k) \quad (9)$$

where the masking $M_r$ (k) is defined as $$M_r(k) = \begin{cases} 1, & k \in S_r \\ 0, & \text{otherwise} \end{cases} \quad (10)$$

and $S_r$ is the a set with selected parameter bands for feature r. For example, the set $S_r$ may be selected to include only the bands of interest for each of the features 422. As a specific example in one embodiment, and as discussed in more detail below, the set $S_r$ may be selected to include only bands 21-60 of the ICPD. As another specific example in one embodiment, the set $S_r$ may be selected to include various sub-bands or sets of frequency bins (e.g., as discussed below as relating to reducing the dimensionality of the data).

The histogram analyzer 408 generally calculates histograms 426 on parameter bands (also referred to as sub-bands) for each of the modified features 424. Specifically, each parameter band b has a histogram with $n_{BarsPerHist}$ bars. The histogram is generated based on the feature that belongs to the parameter band b, i.e., r'(k), $k \in \{k_b\}$.

In consideration of frequency band energy and parameter band energy, we take two weighting coefficients for the modified feature, i.e., frequency band energy weighting $g_F$ and parameter band energy weighting $g_P$ respectively.

Frequency band energy weighting $g_F$ (k) is calculated by $$g_F(k) = \frac{|x(k)|}{\sum_{k \in \{k_b\}} |x(k)|}, k \in \{k_b\} \quad (11)$$

Parameter band energy weighting $g_P$ (k) is calculated by $$g_P(k) = \frac{\sum_{k \in \{k_b\}} |x(k)|}{\sum_{all\ k} |x(k)|}, k \in \{k_b\} \quad (12)$$

Then, the histogram h(i) on the parameter band is calculated by $$h(i) = \frac{\sum_{k \in K_i} g_F(k) g_P(k)}{\sum_{k \in \{k_b\}} g_F(k) g_P(k)} i = 1, \ldots, n_{BarsPerHist} \quad (13)$$

where $$K_{i,r} = \left\{ k \in \{k_b\} \middle| i = \left\lfloor \frac{r'(k)}{\max(r'(k))} \cdot n_{BarsPerHist} \right\rfloor \right\} \quad (14)$$

and $\lfloor * \rfloor$ denotes the floor function.

The statistics calculator 410 generally calculates window-level statistics for the modified features 424 and the histograms 426 for N frames forming a window length. The statistics calculator 410 calculates statistics such as the mean and standard variation of the histograms (with regarding to N) as the final features. The statistics calculator 410 provides these statistics as the features 240 to the classifier 204 (see FIG. 2).

Model Training

As discussed above, the classifier 204 (see FIG. 2) implements a machine learning process to perform classification. According to an embodiment, the machine learning model stored by the classifier 204 is a static model. In general, a static model has been trained off-line (e.g., when the device is manufactured or initialized, such as during the software build of the firmware) and does not change during operation of the device (e.g., unless the firmware of the device is updated). A static model may be contrasted with a dynamic model, which changes as the device is operated, according to the changing inputs. In general, creation of the static model is performed on training data, and the static model— once created—operates on operational data.

The training data may be selected based on similar categories of data to those that that the operational system is anticipated to operate on. Example categories include cinematic content (e.g., movies in various genres such as drama, comedy, action, etc.), broadcast content (e.g., sports, advertisements, programs in various genres such as drama, comedy, news, etc.), musical content (e.g., selected from various genres such as classical, pop, etc.), gaming content, etc. The length of content for training purposes may range from as low as 5 hours to as high as 20 hours or more, for each general category, with the understanding that more diverse content will improve the robustness of the model.

The model may be trained using pure binaural data (e.g., audio captured using a binaural microphone), using rendered binaural (e.g., non-binaurally captured audio that has been rendered into binaural format using head-related transfer functions, for example), or both. The model may be biased to avoid detecting binaural as stereo; when the decision is indeterminate between binaural versus stereo, the decision bias is toward binaural.

The following paragraphs describe various training processes that may be used to generate the static model. For brevity, they are described in the context of the operational system (e.g., FIGS. 1-4), with the understanding that the training system should resemble the operational system in order for the static model to be accurate.

Option 1: Single Feature

One option is to use a single feature, for example ICPD. Referring to FIG. 4, the signal transformer 402 is configured to transform the input audio signal 220 into information in 77 HCQMF bins (also referred to as bands), corresponding to the transform domain information 420. The features calculator 404 is configured to calculate the ICPD (see Equation 5) from the information in the 77 HCQMF bins, corresponding to the features 422.

According to analysis of the model training, bins 21-60 (of the 77 HCQMF bins) were determined to provide particularly robust classification results. Accordingly, the parameter mask 406 is configured to apply masking such that the modified features 424 correspond to bins 21-60 being selected.

The histogram analyzer 408 is configured to calculate a histogram with B bars on each bin of the modified features 424, and to calculate the frequency band energy and parameter band energy (see Equations 11-12), to result in the final frame-level features (corresponding to the histograms 426).

Finally, the statistics calculator 410 is configured to calculate the mean and standard deviation of the histograms 426 over a defined period, such as 1 second.

Option 2: Multiple Features

Another option is to use multiple features. In this option, the selected features are ICPD, ICLD and ICC. Referring to FIG. 4, the signal transformer 402 is configured to transform the input audio signal 220 into information in HCQMF bins (e.g., 77 HCQMF bins according to one embodiment), corresponding to the transform domain information 420. Additionally, the signal transformer 402 is configured to group the HCQMF bins into sub-bands. According to one embodiment, the 77 HCQMF bins are grouped into 4 sub-bands; an example grouping is bins 1 to 10 into sub-band 1, bins 11 to 18 into sub-band 2, bins 19 to 30 into sub-band 3, and bins 31 to 77 into sub-band 4. The features calculator 404, the parameter mask 406, the histogram analyzer 408 and the statistics calculator 410 are configured to process the input information as follows.

Eight features in 436-dimensional can be categorized as in TABLES 1-3 (note that there is some overlap):

TABLE 1

| ICPD-related (254 total) | |
| --- | --- |
| Feature | Dimensions |
| ICPD | 88 |
| weightedICPD | 88 |
| rWICPD | 8 |
| rICPD | 8 |
| histICGD | 62 |

TABLE 2

| ICC-related (252 total) | |
| --- | --- |
| Feature | Dimensions |
| ICC | 88 |
| weightedICPD | 88 |
| histICGD | 62 |
| ratioICC | 6 |
| rWICPD | 8 |

TABLE 3

| ICLD-related (88 total) | |
| --- | --- |
| Feature | Dimensions |
| ICLD | 88 |

In TABLES 1-3, ICPD, ICC and ICLD are as described above. In general, each 88-dimensional feature is computed, and the other features are derived from the computed features. weightedICPD corresponds to the histogram of the product of ICPD and ICC. The feature rWICPD corresponds to the following equation:

$$rWICPD(b) = \sum_{j=1}^{n} \mathbb{E}[weightedICPD(j)] - \sum_{j=1}^{n} \mathbb{E}[weightedICPD(n_{BarsPerHist} - j)], j \in \{k_b\}$$

where b is the sub-band index, and $\{k_b\}$ is set containing all frequency bands in sub-band b. The value n could be any value that smaller than $\lfloor (n_{BarsPerHist}-1)/2 \rfloor$. Typical values for n include 1 or 3.

The feature rICPD corresponds to the following equation:

$$rICPD(b) = \sum_{j=1}^{n} \mathbb{E}[\phi(j)] - \sum_{j=1}^{n} \mathbb{E}[\phi(n_{BarsPerHist} - j)], j \in \{k_b\} \quad (16)$$

where $\phi(k)$ is the ICPD defined in equation (5).

The feature histICGD corresponds to the histogram of ICGD, where ICGD is computed by $\phi(k)/f_c(k)$, where $\phi(k)$ is the ICPD defined in equation (5), and $f_c(k)$ is the central frequency of band k. The feature ratioICC corresponds to the fraction between the weighted ICC of the current sub-band and the overall weighted ICC, namely, $$ratioICC(b) = \frac{\sum_{k \in k_b} g_F(k)c(k)}{\sum_{all\ k} g_F(k)g_P(k)c(k)}, k \in \{k_b\} \quad (17)$$

where $g_F$ and $g_p$ are defined in equations (11) and (12), respectively. Note that weightedICPD, rWICPD and histICGD are cross-category features. Each feature includes the mean and standard deviation as discussed above. For example, the 88-dimensional ICPD includes a 44-dimensional mean and a 44-dimensional standard deviation.

During model testing, various feature selection permutations were evaluated under both a seen case (e.g., using data generated by a known binauralizer) and an unseen case (e.g., using data generated by an unknown binauralizer). A number of conclusions resulted from these experiments. First, grouping the features into three categories (as in TABLES 1-3) can achieve better performance than using two categories, if the same number of features are selected. Second, preserving the ratioICC (6-dimensional) and histICGD (62-dimensional) usually improves the accuracy for the unseen case; these two features play a significant role for the unseen case. Third, the features with high dimension (e.g., ICPD is 88-dimensional) have some effects on the seen case. Fourth, adding the ICLD (88-dimensional) usually improves the accuracy for both cases.

Then, the sub-bands are used to reduce the 436-dimensional to 200-dimensional. Specifically, ICPD is computed using sub-bands 1 and 2 (sub-bands 3 and 4 are dismissed), for 44-dimensional; ICC is computed using sub-bands 1 and 2 (sub-bands 3 and 4 are dismissed), for 44-dimensional; ICLD is computed using sub-bands 3 and 4 (sub-bands 1 and 2 are dismissed), for 44-dimensional; histICD is preserved, for 62-dimensional; ratioICC is preserved, for 6-dimensional; and weightedICPD, rWICPD and rICPD are discarded. As a result of this reduction, the accuracy remains for the seen case, and the accuracy improves slightly for the unseen case.

Machine Learning Model Options

As discussed above, various machine learning models may be used to implement the classifier 204 (see FIG. 2) or to perform the model training. Suitable machine learning models include the AdaBoost (adaptive boosting) model, the deep neural network (DNN) model, and a sparse DNN model.

The AdaBoost model generally generates a strong classifier out of a set of weak classifiers. In one embodiment, each weak classifier is a naive Bayesian classifier that makes a binary decision based on one feature. The first weak classifier was built by searching for the most discriminative feature. Based on the classification results of this weak classifier, the weights of those misclassified samples are increased when building the next weak classifier. That is, the next weak classifier focuses more on those errors made by previous weak classifiers, and thus complimentary features may be selected and accordingly increase the overall accuracy of the strong classifier.

The DNN model generally aggregates multiple stages of interconnected nodes. This "deep" aspect may be contrasted with a "shallow" neural network, which has fewer stages of interconnected nodes. The DNN used herein may be a multi-layer network that contains hidden layers. In one embodiment, a 3-hidden layer DNN is used, where each hidden layer contains 200 nodes, applies 50% dropouts and uses sigmoid as activation function.

The sparse DNN model generally refers to a DNN to which methods have been applied to regularize the structures (e.g., the filters, node weights, etc.) in order to reduce the memory footprint of the model. In one embodiment, the weights of the trained model are quantized based on the following equation:

$$w_q = \begin{cases} 0, & |w| \leq 0.15 \\ (s_i + s_{i+1})/2, & s_i < w \leq s_{i+1} \text{ and } |w| > 0.15 \\ w, & |w| \geq 1.05 \end{cases} \quad (18)$$

where $w_q$ is the quantized weight, $s_i$ is quantization scale with step 0.1, as s=[−1.05 −0.95 −0.85 −0.75 −0.65 −0.55 −0.45
−0.35 −0.25 −0.15 0.15 0.25 0.35 0.45 0.55
0.65 0.75 0.85 0.95 1.05]

Using similar techniques like sparse matrix storage, the footprint of the model can be reduced. Meanwhile, the computation complexity of the model can be also reduced, while the generalization capability of the model can be increased.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. An apparatus for detecting binauralization of an audio signal, the apparatus comprising:
a feature extractor that is configured to receive an input audio signal, and that is configured to extract a plurality of features from the input audio signal;
a classifier that is configured to receive the plurality of features extracted by the feature extractor, that is configured to perform a classification of the plurality of features, and that is configured to generate a result based on the classification, wherein the result indicates a probability that the input audio signal is a binaural signal;
a virtualizer that is configured to receive the input audio signal, and that is configured to perform virtualization on the input audio signal to generate a binaural audio signal; and
a mixer that is configured to receive the input audio signal, the binaural audio signal and the result, and that is configured to generate an output audio signal according to the result,
wherein when the result indicates that the input audio signal is not the binaural signal, the output audio signal corresponds to the binaural audio signal, and
wherein when the result indicates that the input audio signal is the binaural signal, the output audio signal corresponds to the input audio signal.

2. The apparatus of claim 1, further comprising:
a smoother that is configured to smooth the result from the classifier, and that is configured to provide the result, having been smoothed, to the mixer,
wherein the mixer is configured to mix the input audio signal and the binaural audio signal according to the result having been smoothed by the smoother.

3. The apparatus of claim 2, wherein the result, having been smoothed by the smoother, is provided to the virtualizer, and wherein the virtualizer is configured to perform virtualization based on the result having been smoothed.

4. The apparatus of claim 1, wherein the feature extractor is configured to transform the input audio signal into transform domain information.

5. The apparatus of claim 1, wherein the feature extractor is configured to extract features including at least one of an inter-channel time difference (ICTD) feature, an inter-channel phase difference (ICPD) feature, an inter-channel level difference (ICLD) feature, and an inter-channel coherence (ICC) feature.

6. The apparatus of claim 1, wherein the feature extractor is configured to transform the input audio signal into hybrid complex quadrature mirror filter (HCQMF) domain information.

7. The apparatus of claim 1, wherein the feature extractor is configured to transform the input audio signal into hybrid complex quadrature mirror filter (HCQMF) domain information, and wherein the feature extractor is configured to extract features including an inter-channel phase difference (ICPD) of a subset of bands of the HCQMF domain information.

8. The apparatus of claim 7, wherein the HCQMF domain information includes 77 bands, and wherein the subset of bands includes bands 21-60.

9. The apparatus of claim 1, wherein the feature extractor is configured to transform the input audio signal into hybrid complex quadrature mirror filter (HCQMF) domain information, wherein the feature extractor is configured to group the HCQMF domain information into a plurality of sub-bands, wherein the feature extractor is configured to extract features including an inter-channel phase difference (ICPD) feature of a first subset of the plurality of sub-bands, an inter-channel coherence (ICC) feature of the first subset of the plurality of sub-bands, and an inter-channel level difference (ICLD) feature of a second subset of the plurality of sub-bands.

10. The apparatus of claim 1, wherein the feature extractor comprises:
a signal transformer that is configured to generate transform domain information from the input audio signal;
a features calculator that is configured to calculate a plurality of raw features from the transform domain information;
a parameter mask that is configured to apply masking to the plurality of raw features, to generate a plurality of modified features;
a histogram analyzer that is configured to calculate a plurality of histograms on a plurality of parameter bands for each of the plurality of modified features; and
a statistics calculator that is configured to calculate a plurality of window-level statistics from the plurality of modified features and the plurality of histograms, wherein the plurality of window-level statistics correspond to the plurality of features extracted by the feature extractor.

11. The apparatus of claim 1, wherein the classifier is configured to implement a machine learning model to perform the classification of the plurality of features.

12. The apparatus of claim 11, wherein the machine learning model is one of an adaptive boosting model, a deep neural network model, and a sparse deep neural network model.

13. The apparatus of claim 1, further comprising:
a processor; and
a memory,
wherein the processor is configured to implement the feature extractor, the classifier, the virtualizer, and the mixer.

14. The apparatus of claim 13, wherein the memory stores a computer program, and wherein the processor is configured to execute the computer program to implement the feature extractor, the classifier, the virtualizer, and the mixer.

15. The apparatus of claim 1, wherein the output audio signal includes a left output component and a right output component, the apparatus further comprising:
a left speaker that is configured to output the left output component; and
a right speaker that is configured to output the right output component.

16. The apparatus of claim 1, further comprising:
a first earbud; and
a second earbud,
wherein the first earbud includes a first speaker, a first processor and a first memory, wherein the first processor is configured to implement the feature extractor, the classifier, the virtualizer, and the mixer, and
wherein the second earbud includes a second speaker, a second processor and a second memory, wherein the second processor is configured to implement a second feature extractor, a second classifier, a second virtualizer, and a second mixer.

17. The apparatus of claim 1, wherein the result indicates the probability that the input audio signal is the binaural signal versus a stereo signal, and
wherein when the result indicates that the input audio signal is the stereo signal, the output audio signal corresponds to the binaural audio signal.

18. The apparatus of claim 1, wherein the mixer is configured to mix the input audio signal and the binaural audio signal according to the result.

19. A method of detecting binauralization of an audio signal, the method comprising:
receiving an input audio signal;
extracting, by a feature extractor, a plurality of features from the input audio signal;
performing, by a classifier, a classification of the plurality of features extracted by the feature extractor;
generating, by the classifier, a result based on the classification, wherein the result indicates a probability that the input audio signal is a binaural signal;
performing virtualization, by a virtualizer, on the input audio signal to generate a binaural audio signal; and
generating, by a mixer, an output audio signal according to the result,
wherein when the result indicates that the input audio signal is not the binaural signal, the output audio signal corresponds to the binaural audio signal, and
wherein when the result indicates that the input audio signal is the binaural signal, the output audio signal corresponds to the input audio signal.

20. A non-transitory computer readable medium storing a computer program that, when executed by a processor, controls an apparatus to execute processing including the method of claim 19.

* * * * *

UNITED STATES PATENT AND TRADEMARK OFFICE
CERTIFICATE OF CORRECTION

| | | |
|---|---|---|
| PATENT NO. | : 11,929,091 B2 | Page 1 of 1 |
| APPLICATION NO. | : 17/683662 | |
| DATED | : March 12, 2024 | |
| INVENTOR(S) | : Chunmao Zhang et al. | |

It is certified that error appears in the above-identified patent and that said Letters Patent is hereby corrected as shown below:

On the Title Page

Column 1, (30) Foreign Application Priority Data, Delete "(WO)" and insert --(CN)-- therefor Signed and Sealed this
Twenty-second Day of July, 2025

Coke Morgan Stewart
*Acting Director of the United States Patent and Trademark Office*